(12) United States Patent
Nishiyama et al.

(10) Patent No.: US 6,647,710 B2
(45) Date of Patent: Nov. 18, 2003

(54) EXHAUST GAS PURIFYING APPARATUS FOR INTERNAL COMBUSTION ENGINES

(75) Inventors: Toshihiko Nishiyama, Oyama (JP); Koutarou Wakamoto, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/189,534

(22) Filed: Jul. 8, 2002

(65) Prior Publication Data

US 2003/0010021 A1 Jan. 16, 2003

(30) Foreign Application Priority Data

Jul. 11, 2001 (JP) ........................................ 2001-210718

(51) Int. Cl.[7] ............................................... F01N 3/00
(52) U.S. Cl. ............................. 60/286; 60/288; 60/295; 60/301; 137/875
(58) Field of Search ........................ 60/286, 287, 288, 60/295, 297, 301; 123/337, 323; 137/875, 876; 138/46

(56) References Cited

U.S. PATENT DOCUMENTS

| | | | | |
|---|---|---|---|---|
| 5,060,865 A | * | 10/1991 | Alder et al. | 138/46 |
| 5,365,734 A | * | 11/1994 | Takeshima | 60/288 |
| 5,372,109 A | * | 12/1994 | Thompson et al. | 123/323 |
| 5,406,790 A | * | 4/1995 | Hirota et al. | 60/286 |
| 5,457,958 A | * | 10/1995 | Boegner et al. | 60/297 |
| 5,910,097 A | * | 6/1999 | Boegner et al. | 60/301 |
| 6,076,499 A | * | 6/2000 | Klumpp | 123/337 |
| 6,105,365 A | * | 8/2000 | Deeba et al. | 60/288 |
| 6,502,391 B1 | * | 1/2003 | Hirota et al. | 60/288 |

* cited by examiner

Primary Examiner—Thomas Denion
Assistant Examiner—Tu M. Nguyen
(74) Attorney, Agent, or Firm—Varndell & Varndell, PLLC

(57) ABSTRACT

An exhaust gas purifying apparatus for internal combustion engines, which comprises an exhaust pipe, a branched exhaust pipe, a first NOx adsorbing catalyst provided in the exhaust pipe, a second small-sized NOx adsorbing catalyst provided in the branched exhaust pipe, and an exhaust switchover valve. The exhaust switchover valve including exhaust holes, a first feed pipe having a first switchover valve, and a second feed pipe having a second switchover valve, the first and second feed pipes being opened between the exhaust switchover valve and the first NOx adsorbing catalyst and between the exhaust switchover valve and the second NOx adsorbing catalyst, respectively. The first and second feed pipes are supplied with a fuel from a feed pump. A controller is connected to a NOx accumulation checking device, exhaust switchover valve, first switchover valve, and the second switchover valve.

9 Claims, 6 Drawing Sheets

EXHAUST GAS PURIFYING APPARATUS FOR INTERNAL COMBUSTION ENGINES

BACKGROUND OF THE INVENTION

The invention relates to an exhaust gas purifying apparatus for internal combustion engines.

Heretofore, various proposals have been made for an exhaust gas purifying apparatus for internal combustion engines, an example thereof being disclosed in Japanese Patent Laid-Open No. 106826/1987 and Japanese Patent No. 2600492.

Japanese Patent Laid-Open No. 106826/1987 discloses an arrangement, in which an engine exhaust passage is branched into a pair of exhaust branch passages, two NOx adsorbing catalysts of the same dimension are arranged in parallel in the respective branch passages, and a switchover valve is provided in a branch of the exhaust passage. The switchover valve prevents exhaust gases from passing through the catalyst in one of the exhaust branch passages, and exhaust gases are caused to pass through one of the NOx adsorbing catalysts to adsorb NOx while NOx accumulated in the other of the NOx adsorbing catalysts is reduced and removed by means of a gaseous reducing agent. In addition, for example, hydrocarbon is used as the gaseous reducing agent and introduced from a hydrocarbon generating apparatus.

Japanese Patent No. 2600492 discloses an arrangement, in which a single NOx adsorbent is arranged in an exhaust passage of an engine and constantly passes therethrough exhaust gases in operation of the engine. In normal operation, an air-fuel mixture in engine cylinders is lean and NOx in exhaust gases is adsorbed by the NOx adsorbent. When a NOx accumulation in the NOx adsorbent is increased in amount, an oxygen concentration in exhaust gases is decreased to release NOx from the NOx adsorbent and reduce the same. In order to decrease an oxygen concentration in exhaust gases, an air-fuel ratio of exhaust gases is made substantially stoichiometric air-fuel ratio or rich.

However, the above-mentioned arrangements involve the following problems.

With the arrangement disclosed in Japanese Patent Laid-Open No. 106826/1987, the two same NOx adsorbing catalysts are arranged in parallel to become large in space and volume, which makes it difficult for such arrangement to be mounted on, for example, a vehicle or the like. Also, the use of hydrocarbon being a gaseous reducing agent causes a need of a hydrocarbon generating apparatus, which makes the construction complicated and increases cost.

With the arrangement disclosed in Japanese Patent No. 2600492, an amount of fuel supplied into cylinders is increased when exhaust gases are made rich in air-fuel ratio in order to release NOx from the NOx adsorbent and reduce the same. Therefore, an increase in exhaust temperature and cylinder pressure is caused at the time of high output, which causes a fear of adverse influences on durability and reliability of an engine.

SUMMARY OF THE INVENTION

The invention has been thought of in view of the above-mentioned problems, and has its object to provide an exhaust gas purifying apparatus for internal combustion engines, which is decreased in space and volume, free of adverse influences on durability and reliability of an engine, simple in construction, and low in cost.

In order to attain the above-mentioned object, a first invention provides an exhaust gas purifying apparatus for internal combustion engines, in which a NOx adsorbing/reducing catalyst device for adsorbing NOx and decreasing an oxygen concentration to feed a reducing agent to release and reduce NOx when exhaust gases are lean in air-fuel ratio is provided in an exhaust pipe of an internal combustion engine, the apparatus comprising a first NOx adsorbing catalyst, a second NOx adsorbing catalyst provided in parallel to the first NOx adsorbing catalyst and having a small adsorbing capacity as compared with that of the first NOx adsorbing catalyst, an exhaust gas flow passage switchover means for switching an exhaust gas flow between the first NOx adsorbing catalyst and the second NOx adsorbing catalyst, first NOx releasing and reducing means for causing a gas containing a reducing agent to flow toward the first NOx adsorbing catalyst to decrease an oxygen concentration and releasing and reducing NOx while exhaust gases flow toward the second NOx adsorbing catalyst, and second NOx releasing and reducing means for causing a gas containing a reducing agent to flow toward the second NOx adsorbing catalyst to decrease an oxygen concentration and releasing and reducing NOx while exhaust gases flow toward the first NOx adsorbing catalyst.

According to the first invention, two NOx adsorbing/reducing catalyst devices having different capacities are provided in parallel, and flow of exhaust gases directed to the NOx adsorbing catalysts is switched over to one of the catalysts by the exhaust gas flow passage switchover means. For example, a small amount of exhaust gases or a gas such as air or the like is caused to flow into a side, in which flow of exhaust gases is stopped, to generate flow passing through the NOx adsorbing catalyst, and for example, a fuel is fed as a reducing agent to enable decreasing an oxygen concentration and releasing and reducing NOx. Therefore, even when NOx is released and reduced at the time of high output, degradation in durability and reliability of the engine due to an increase in exhaust temperature and cylinder pressure is prevented since any surplus load is not supplied into cylinders. Also, since it suffices that a small amount of exhaust gases or air be made rich, an amount of a reducing agent can be decreased and the apparatus can be made small in space and volume and inexpensive because of one of the NOx adsorbing catalysts being made smaller in capacity than the other.

A second invention comprises, in addition to the constitution of the first invention, exhaust gas passing means, by which a smaller amount of exhaust gases than that of exhaust gases flowing toward the second NOx adsorbing catalyst is permitted to flow toward the first NOx adsorbing catalyst when NOx in the first NOx adsorbing catalyst is to be released and reduced while exhaust gases flow toward the second NOx adsorbing catalyst and a smaller amount of exhaust gases than that of exhaust gases flowing toward the first NOx adsorbing catalyst is permitted to flow toward the second NOx adsorbing catalyst when NOx in the second NOx adsorbing catalyst is to be released and reduced while exhaust gases flow toward the first NOx adsorbing catalyst, and reducing agent feeding means for making exhaust gases, which are on a side where NOx is to be released and reduced, near a stoichiometric mixture ratio or rich.

According to the second invention, a small amount of exhaust gases is caused to flow toward that NOx adsorbing catalyst, from which NOx is released and reduced, and a reducing agent is fed to the NOx adsorbing catalyst to make exhaust gases near a stoichiometric mixture ratio or rich, so that a small amount of the reducing agent serves in use. Also, since a gas for generating flow on that NOx adsorbing catalyst, from which NOx is released and reduced, is exhaust gases, the apparatus is made simple in construction and can be made inexpensive.

A third invention comprises, in addition to the constitution of the first and second inventions, NOx accumulation checking means for checking a NOx accumulation in the first NOx adsorbing catalyst, and exhaust gas flow passage switchover/control means for permitting exhaust gases to flow toward the first NOx adsorbing catalyst when the engine is normally operated, and permitting exhaust gases to flow toward the second NOx adsorbing catalyst when a NOx accumulation in the first NOx adsorbing catalyst exceeds a predetermined value.

According to the third invention, a NOx accumulation in the first NOx adsorbing catalyst is checked and flow toward the first or second NOx adsorbing catalyst is switched over, so that timing in switchover becomes correct and the number of switchover and an amount of a reducing agent used can be decreased, which makes the apparatus economical.

A fourth invention comprises, in addition to the constitution of the first and second inventions, NOx releasing/reducing control means, by which switchover of the exhaust gas flow passage caused by the exhaust gas flow passage switchover means, and NOx releasing/reducing operations caused by the first and second NOx releasing and reducing means are performed at predetermined time intervals.

According to the fourth invention, switchover of flow passages, release and reduction can be made periodically on the basis of periods of time, in which a NOx accumulation in the respective NOx adsorbing catalysts having been beforehand checked reaches allowable limits, and periods of time required for release and reduction of NOx. Therefore, NOx accumulation checking means or the like is dispensed with, and the apparatus is simple in construction and low in cost.

According to a fifth invention, the second NOx adsorbing catalyst has a capacity conformed to a period of time, in which NOx adsorbed by the first NOx adsorbing catalyst can be released and reduced, in the constitution of the first to fourth inventions.

According to the fifth invention, it is possible to attain optimization of the second NOx adsorbing catalyst in dimension and make the same minimum, thus enabling making the apparatus small in space and volume.

According to a sixth invention, the second NOx adsorbing catalyst has a capacity 1/5 to 1/20 as much as that of the first NOx adsorbing catalyst in the constitution of the first to fifth inventions.

According to the sixth invention, since the NOx adsorbing catalyst can be made small in space and volume, the exhaust gas purifying apparatus can be made small in size.

According to a seventh invention, an amount of a gas flowing to that NOx adsorbing catalyst, from which NOx is to be released and reduced, is 1/10 or less as much as a whole amount of exhaust gases in the constitution of the first to sixth inventions.

According to the seventh invention, exhaust gases flowing at the time of release and reduction of NOx are small in amount and made near a stoichiometric mixture ratio or rich, so that an amount of a reducing agent used can be decreased to lead to economy.

DESCRIPTION OF THE PREFERRED EMBODIMENTS

An embodiment of an exhaust gas purifying apparatus for internal combustion engines according to the invention will be described in detail with reference to the drawings.

Figure 1:
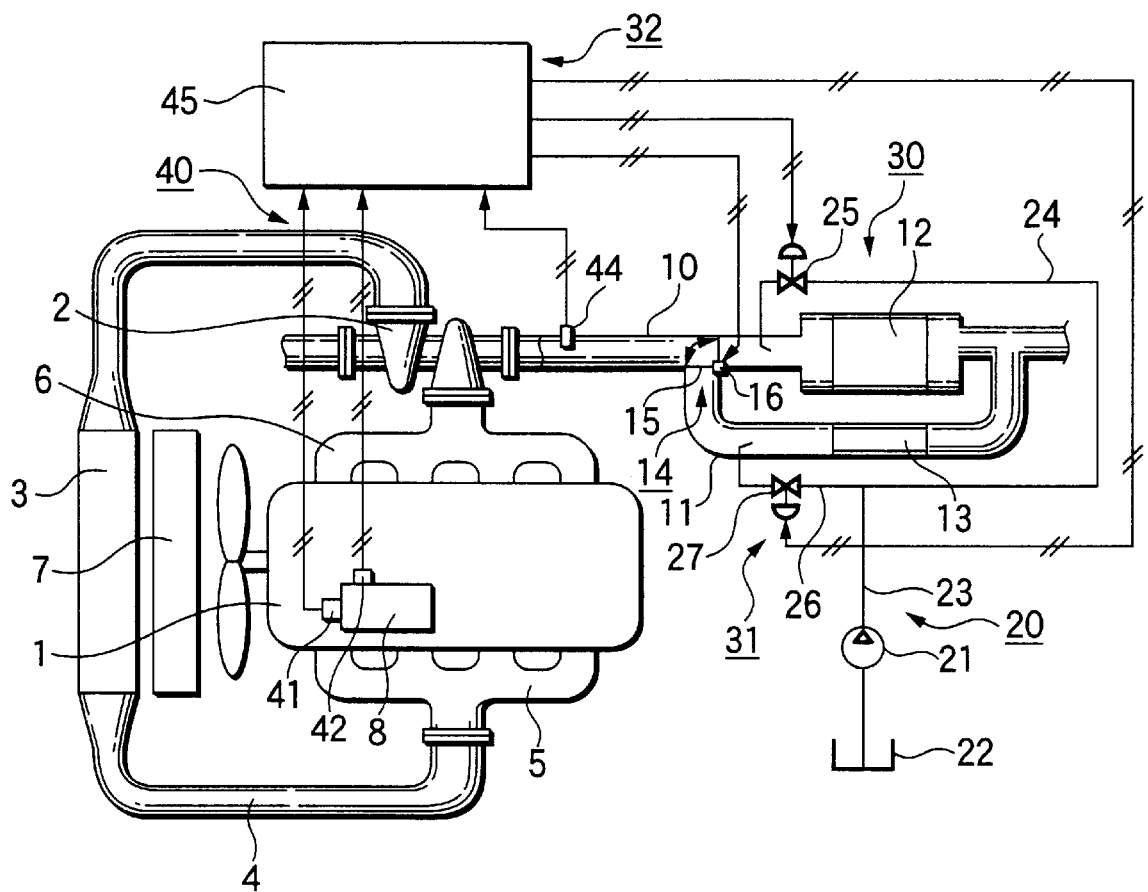
FIG. 1 is a block diagram of an exhaust gas purifying apparatus according to a first embodiment of the invention.
Figure 2:
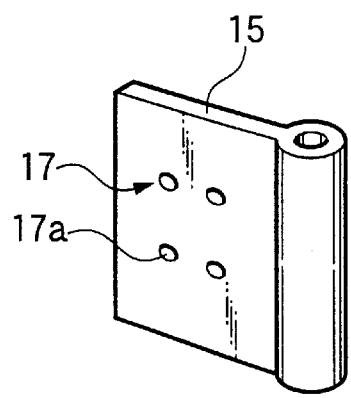
FIG. 2 is a perspective view showing an exhaust switchover valve in the exhaust gas purifying apparatus according to the first embodiment of the invention.

FIG. 1 is a block diagram of an exhaust gas purifying apparatus according to a first embodiment. In FIG. 1, engine 1 has a turbocharger 2, and an air pressure fed by the turbocharger 2 is cooled by an intercooler 3 to be fed to the engine 1 via a feed pipe 4 and an intake manifold 5. Exhaust gases discharged as a result of combustion in the engine 1 is discharged into an exhaust pipe 10 via an exhaust manifold 6. A branch exhaust pipe 11 is provided on the exhaust pipe 10 to branch off therefrom in parallel thereto, and a first NOx adsorbing catalyst 12 is arranged in the exhaust pipe 10 to serve as a main part, a second NOx adsorbing catalyst 13 being arranged in the branch exhaust pipe 11 to serve as a sub-part and smaller in capacity than the first NOx adsorbing catalyst 12. The capacity of the second NOx adsorbing catalyst 13 is determined in accordance with a period of time, during which NOx adsorbed by the first NOx adsorbing catalyst 12 can be released and reduced, and 1/5 to 1/20 as much as that of the first NOx adsorbing catalyst 12. Provided in a position where the exhaust pipe 10 and the branch exhaust pipe 11 branch off from each other is an exhaust switchover valve 15 adapted to turn in a manner shown by an arrow to switch a flow of exhaust gases between a side of the first NOx adsorbing catalyst 12 and the second NOx adsorbing catalyst 13. The exhaust switchover valve 15 constitutes an exhaust gas flow passage switchover means 14 together with a rotary motor 16, which turns the exhaust switchover valve 15. FIG. 2 is a perspective view showing the exhaust switchover valve 15, exhaust holes 17a being provided on the exhaust switchover valve 15 to constitute an exhaust gas passing means 17. A size of the exhaust holes 17a is set such that an amount of exhaust gases flowing from the exhaust holes 17a becomes 1/10 or less as much as a whole amount of exhaust gases. In addition, the exhaust gas passing means 17 may be comprised of gaps provided therearound in addition to the exhaust holes 17a. The reference numeral 7 denotes a radiator.

An explanation will be given below to the constitution of a reducing agent feeding means 20. A discharge circuit 23 of a feed pump 21 connected to a reducing agent tank 22, in which a fuel constituting a reducing agent is stored, branches into a first feed pipe 24 and a second feed pipe 26. A first switchover valve 25 is provided on the first feed pipe 24 to have its tip end opened between the exhaust switchover valve 15 and the first NOx adsorbing catalyst 12, and a second switchover valve 27 is provided on the second feed pipe 26 to have its tip end opened between the exhaust switchover valve 15 and the second NOx adsorbing catalyst 13. A first NOx releasing and reducing means 30 is constituted by the exhaust switchover valve 15, the feed pump 21, the first feed pipe 24 and the first switchover valve 25, and a second NOx releasing and reducing means 31 constituted by the exhaust switchover valve 15, the feed pump 21, the second feed pipe 26 and the second switchover valve 27.

An explanation will be given below to the constitution of an exhaust gas flow passage switchover/control means 32. A fuel injection pump 8 provided on the engine 1 is provided with an engine speed meter 41 and a load detector 42, which detects a rack position of the fuel injection pump 8 to detect a fuel injection quantity, and an exhaust temperature sensor 44 is provided upstream of the exhaust pipe 10. The engine speed meter 41, the load detector 42 and the exhaust temperature sensor 44 are connected to a controller 45 to constitute a NOx accumulation checking means 40. The controller 45 is connected to the rotary motor 16 of the exhaust switchover valve 15, the first switchover valve 25, and the second switchover valve 27.

An explanation will be given below to an operation. In FIG. 1, the exhaust switchover valve 15 is initially disposed in a position shown by a solid line, and the exhaust pipe 10 is connected to the first NOx adsorbing catalyst 12. Accordingly, a major part of exhaust gases flows toward the first NOx adsorbing catalyst 12 and a part flows toward the second NOx adsorbing catalyst 13 from the exhaust holes 17*a*. Also, the first switchover valve 25 and the second switchover valve 27 are closed. When the engine 1 is driven, NOx is adsorbed by the first NOx adsorbing catalyst 12 because fuel is lean in air-fuel ratio in normal operating condition. Detected values from the engine speed meter 41 and the load detector 42 are input into the controller 45, which in turn calculates a NOx accumulation in the first NOx adsorbing catalyst 12 on the basis of past actual values previously stored. A period of time S until a NOx accumulation reaches an allowable value is estimated. An accumulation in a NOx adsorbing catalyst varies depending upon exhaust temperature at that time. Therefore, the period of time S is corrected on the basis of a detected value from the exhaust temperature sensor 44. When the period of time S reaches a predetermined value, the controller 45 outputs a control signal to the rotary motor 16 of the exhaust switchover valve 15 to turn the valve to a position shown by broken lines in a manner shown by an arrow in the figure and opens the first switchover valve 25. A major part of exhaust gases flows to the branch exhaust pipe 11, the second NOx adsorbing catalyst 13 adsorbing NOx, and a minor part of exhaust gases flows toward the first NOx adsorbing catalyst 12 to generate a flow there, so that a fuel is fed there from the first feed pipe 24. Therefore, exhaust gases become rich in air-fuel ratio and so NOx adsorbed by the first NOx adsorbing catalyst 12 is released and reduced. Time for release and reduction is extremely short to be usually several seconds. When NOx contained in the first NOx adsorbing catalyst 12 is released and reduced, the controller 45 outputs a control signal to the rotary motor 16 to turn the exhaust switchover valve 15 to return the same to a position shown by a solid line, and closes the first switchover valve 25 while opening the second switchover valve 27. Thereby, the first NOx adsorbing catalyst 12 adsorbs NOx and NOx contained in the second NOx adsorbing catalyst 13 is released and reduced. The above actions are repeated to thereby constantly keep NOx adsorbing catalysts in an optimum condition.

The exhaust gas purifying apparatus for internal combustion engines, according to the invention, is constructed in the above-mentioned manner, and so presents the following effects.

Since any surplus load is not applied on an engine, it is possible to prevent degradation in durability and reliability, due to an increase in exhaust temperature and cylinder pressure.

Since a NOx accumulation is checked and then NOx is released and reduced, the number of release and reduction can be decreased. Also, since a small amount of exhaust gases is made near the stoichiometric mixture ratio or rich, an amount of fuel being a reducing agent may be small to lead to economy.

Since the second NOx adsorbing catalyst can be made sharply small in size as compared with the first NOx adsorbing catalyst, the apparatus can be decreased in space and volume and reduced in cost.

In addition, while fuels are used as a reducing agent in the embodiment, inert gases such as propane gas.

Figure 3:
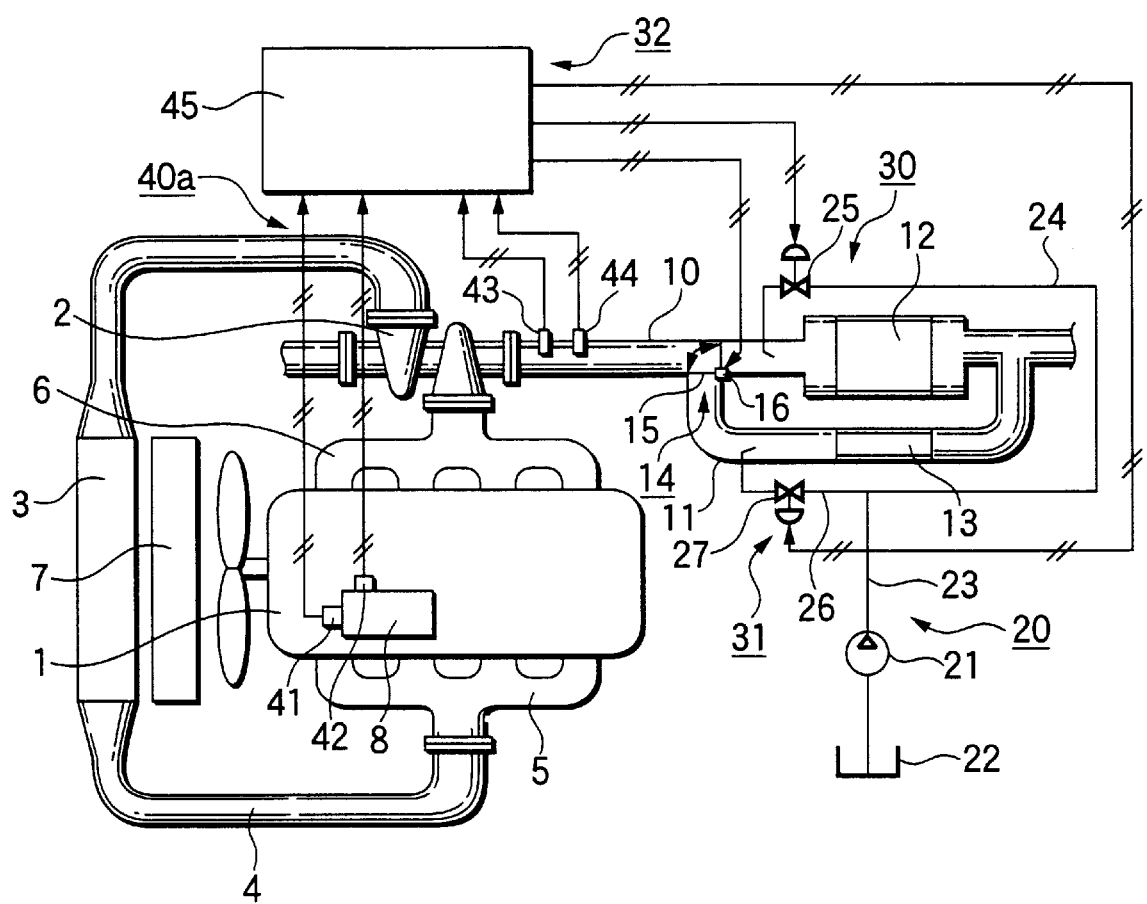
FIG. 3 is a block diagram of an exhaust gas purifying apparatus according to a second embodiment of the invention.

FIG. 3 is a block diagram of an exhaust gas purifying apparatus according to a second embodiment. The same reference numerals denote the same members as those in the first embodiment and so an explanation therefor is omitted while an explanation will be given only to different parts. In the present embodiment, a NOx sensor 43 is provided on the exhaust pipe 10 to constitute a NOx accumulation checking means 40*a* together with the engine speed meter 41. A NOx accumulation in the first and second NOx adsorbing catalysts 12, 13 is calculated by a gas flow rate, which is calculated from detected values of the engine speed meter 41 and the load detector 42, and a detected value from the NOx sensor 43. Other actions are the same as those in the first embodiment, and so an explanation therefor is omitted.

Figure 4:
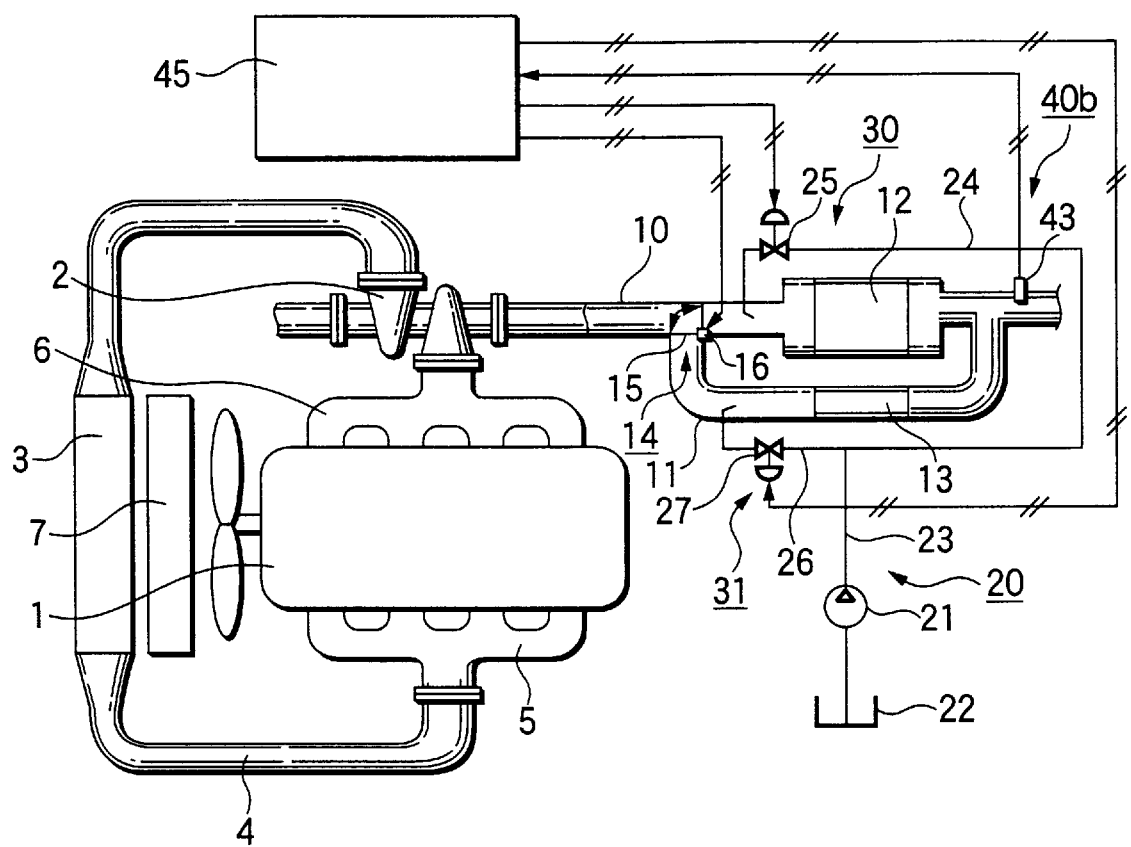
FIG. 4 is a block diagram of an exhaust gas purifying apparatus according to a third embodiment of the invention.

FIG. 4 is a block diagram of an exhaust gas purifying apparatus according to a third embodiment. The same reference numerals denote the same members as those in the first embodiment and so an explanation therefor is omitted while an explanation will be given only to different parts. In the present embodiment, the engine speed meter 41, the load detector 42 and the exhaust temperature sensor 44 are omitted, and a NOx sensor 43 is provided on the exhaust pipe 10 on a side downstream of the first and second NOx adsorbing catalysts 12, 13 to constitute a NOx accumulation checking means 40*b*. A NOx accumulation is found by directly detecting an amount of NOx after the passage through the NOx adsorbing catalysts with the use of the NOx sensor 43.

The accuracy of the NOx accumulation checking means 40*b* will be improved, when a NOx sensor 43 is set in at least one inlet of the first and second NOx adsorbing catalysts 12, 13, and by grasping the NOx accumulation in the way of comparing that of the inlet with that of the outlet.

Other actions are the same as those in the first embodiment, and so an explanation therefor is omitted.

Figure 5:
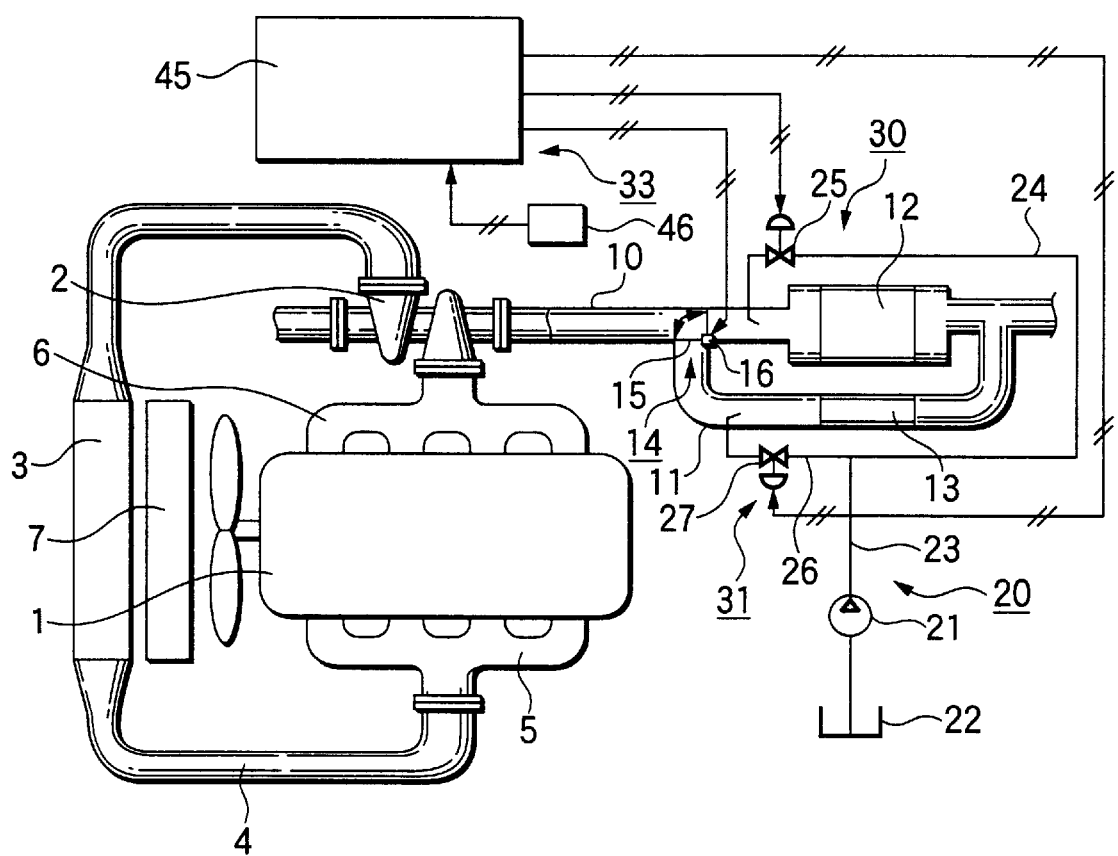
FIG. 5 is a block diagram of an exhaust gas purifying apparatus according to a fourth embodiment of the invention.

FIG. 5 is a block diagram of an exhaust gas purifying apparatus according to a fourth embodiment. The same reference numerals denote the same members as those in the first embodiment and so an explanation therefor is omitted while an explanation will be given only to different parts. In the present embodiment, the NOx accumulation checking means 40 is omitted, and instead a timer 46 is provided to be connected to the controller 45 to constitute a NOx releasing/reducing control means 33. The controller 45 beforehand stores periods of time, in which NOx in the first and second NOx adsorbing catalysts 12, 13 reaches allowable amounts of adsorbed NOx, and periods of time required for the respective NOx adsorbing catalysts to release and reduce NOx. A signal from the timer 46 is input into the controller 45, which in turn periodically outputs control signals to the exhaust switchover valve 15, the first switchover valve 25 and the second switchover valve 27 on the basis of the above periods of time to switch over the same, thus performing release and reduction of NOx. In the present embodiment, the construction is made simple and cost can be decreased because the NOx accumulation checking means 40 is omitted. Also, a combined use of the NOx accumulation checking means 40 makes it possible to set a suitable amount of a reducing agent as fed and save the reducing agent because a NOx accumulation at the time of periodical release and reduction is known.

Figure 6:
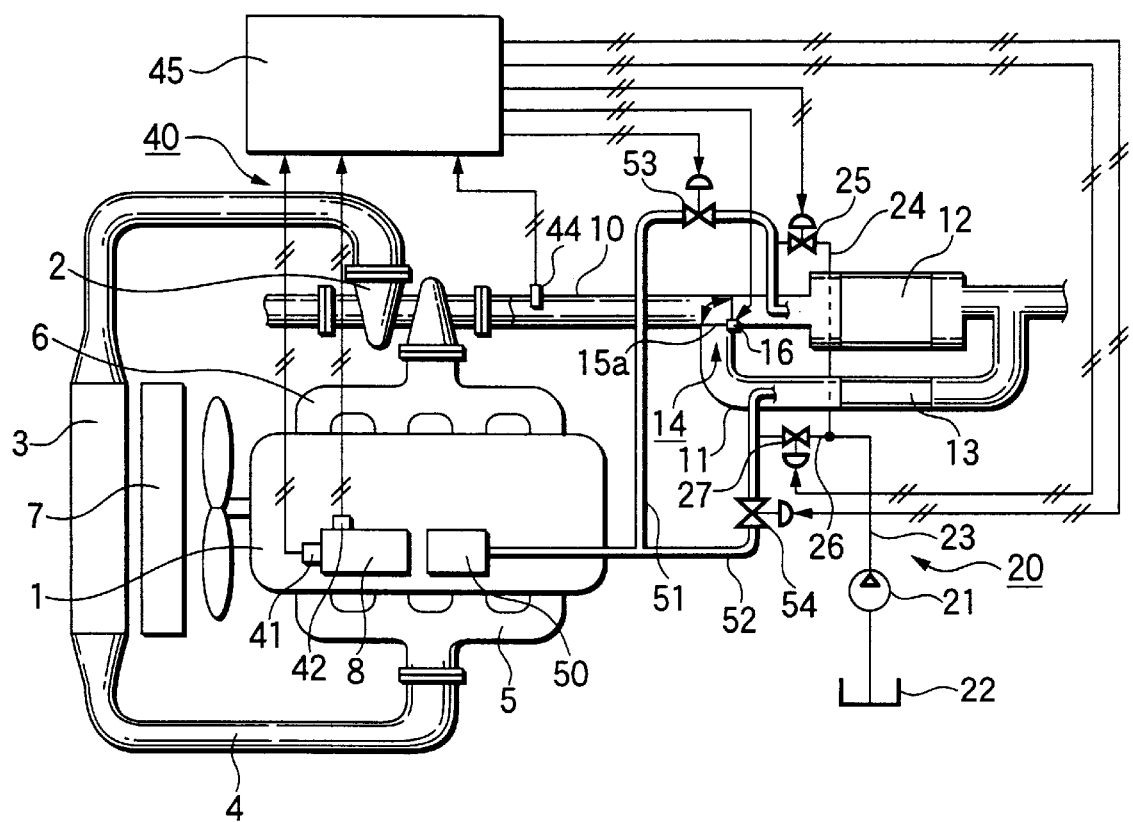
FIG. 6 is a block diagram of an exhaust gas purifying apparatus according to a fifth embodiment of the invention.

FIG. 6 is a block diagram of an exhaust gas purifying apparatus according to a fifth embodiment. The same reference numerals denote the same members as those in the first embodiment and so an explanation therefor is omitted while an explanation will be given only to different parts. An exhaust switchover valve 15a is turnably provided at a branch between the exhaust pipe 10 and the branch exhaust pipe 11. The exhaust switchover valve 15a is not provided with the exhaust holes 17a. Provided on an air compressor 50 provided on the engine 1 are a first feed pipe 51 and a second feed pipe 52 branching off the same, a tip end of the first feed pipe 51 being opened toward the first NOx adsorbing catalyst 12 on a side downstream of the exhaust switchover valve 15, and a tip end of the second feed pipe 52 being opened toward the second NOx adsorbing catalyst 13 on a side downstream of the exhaust switchover valve 15. The first feed pipe 51 is provided thereon with a third switchover valve 53, and the second feed pipe 52 is provided thereon with a fourth switchover valve 54. The first feed pipe 24 connected to the feed pump 21 is connected to a location downstream of the third switchover valve 53 of the first feed pipe 51, and the second feed pipe 26 is connected to a location downstream of the fourth switchover valve 54 of the second feed pipe 52. Like the first embodiment, the first feed pipe 24 is provided with a first switchover valve 25, and the second —feed pipe 26 is provided with a second switchover valve 27.

An operation will be described below. In the initial stage of operation of the engine 1, the exhaust switchover valve 15a is in a position shown by a solid line in FIG. 6, and the first NOx adsorbing catalyst 12 adsorbs NOx. At this time, the first, second, third and fourth switchover valves 25, 27, 53, 54 are closed. The controller 45 receives a signal from the NOx accumulation checking means 40 and outputs a control signal to the exhaust switchover valve 15a to switch the same to a position shown by a broken line in the figure when a NOx accumulation reaches a predetermined value. Thereby, exhaust gases directed to the first NOx adsorbing catalyst 12 is shut off. At the same time, the first and third switchover valves 25, 53 are opened. As a result, a small amount of air is fed toward the first NOx adsorbing catalyst 12 from the first feed pipe 51 to generate flow. At the same time, a fuel is fed from the first feed pipe 24 to make a fluid rich, so that NOx adsorbed by the first NOx adsorbing catalyst 12 is released and reduced. When NOx in the first NOx adsorbing catalyst 12 is released and reduced, a control signal from the controller 45 causes the exhaust switchover valve 15a to be switched to a position shown by a solid line. At the same time, the first and third switchover valves 25, 53 are closed and the second and fourth switchover valves 27, 54 are opened, so that NOx adsorbed by the second NOx adsorbing catalyst 13 is released and reduced.

Figure 7:
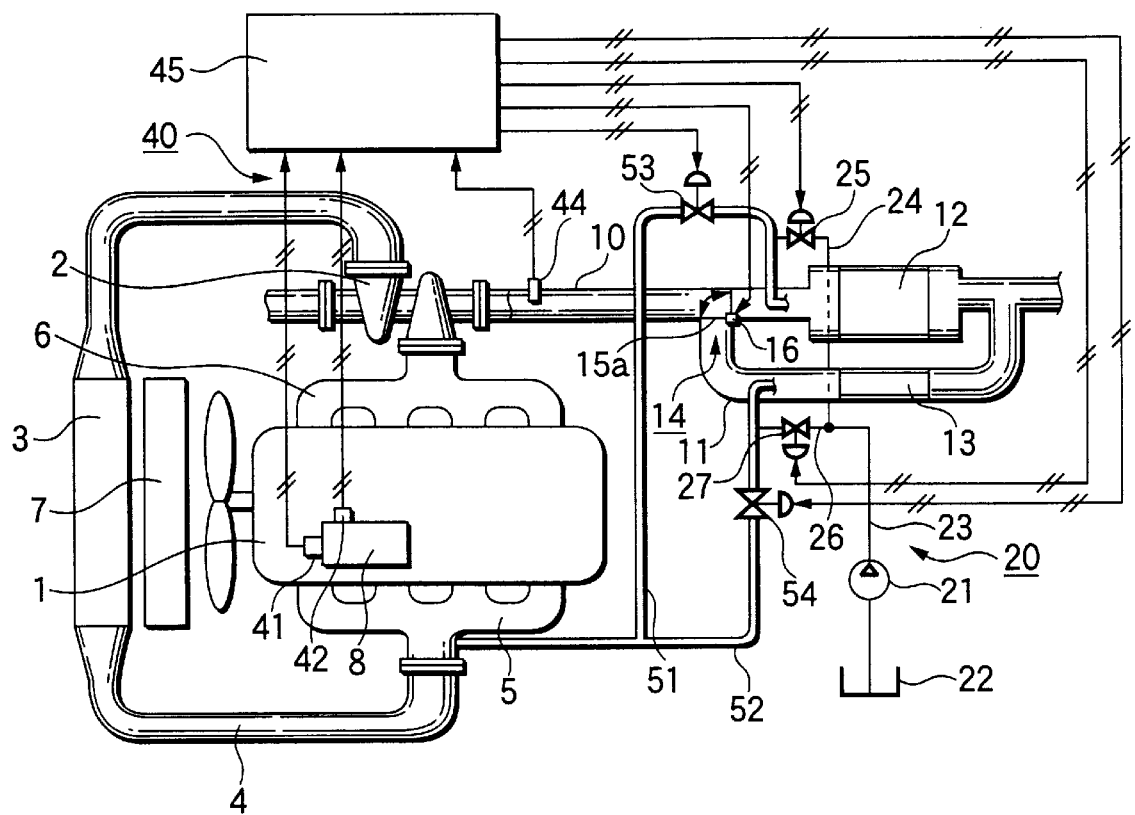
FIG. 7 is a block diagram of an exhaust gas purifying apparatus according to a sixth embodiment of the invention.

FIG. 7 is a block diagram of an exhaust gas purifying apparatus according to a sixth embodiment. The same reference numerals denote the same members as those in the third embodiment and so an explanation therefor is omitted while an explanation will be given only to different parts. In the present embodiment, an air compressor 50 is omitted, and first and second feed pipes 51, 52 are connected to an intake manifold 5 so that an air is supplied by virtue of feed pressure of an intake air. An operation is the same as in the third embodiment, and so an explanation therefor is omitted.

Like the fourth embodiment, a timer 46 may be used in place of the NOx accumulation checking means 40 also in the fifth and sixth embodiments.

What is claimed is:

1. An exhaust gas purifying apparatus for internal combustion engines, in which a NOx adsorbing/reducing catalyst device for adsorbing NOx and decreasing an oxygen concentration to feed a reducing agent to release and reduce NOx when exhaust gases are lean in air-fuel ratio is provided in an exhaust pipe of an internal combustion engine, the apparatus comprising:

a first NOx adsorbing catalyst;

a second NOx adsorbing catalyst provided in parallel to the first NOx adsorbing catalyst and having a small adsorbing capacity as compared with that of the first NOx adsorbing catalyst;

exhaust gas flow passage switchover means for switching an exhaust gas flow between the first NOx adsorbing catalyst and the second NOx adsorbing catalyst;

first NOx releasing and reducing means for causing a gas containing a reducing agent to flow toward the first NOx adsorbing catalyst to decrease an oxygen concentration and releasing and reducing NOx while exhaust gases flow toward the second NOx adsorbing catalyst; and second NOx releasing and reducing means for causing a gas containing a reducing agent to flow toward the second NOx adsorbing catalyst to decrease an oxygen concentration and releasing and reducing NOx while exhaust gases flow toward the first NOx adsorbing catalyst.

2. The apparatus according to claim 1, further comprising exhaust gas passing means, by which a smaller amount of exhaust gases than that of exhaust gases flowing toward the second NOx adsorbing catalyst is permitted to flow toward the first NOx adsorbing catalyst when NOx in the first NOx adsorbing catalyst is to be released and reduced while exhaust gases flow toward the second NOx adsorbing catalyst and a smaller amount of exhaust gases than that of exhaust gases flowing toward the first NOx adsorbing catalyst is permitted to flow toward the second NOx adsorbing catalyst when NOx in the second NOx adsorbing catalyst is to be released and reduced while exhaust gases flow toward the first NOx adsorbing catalyst, and reducing agent feeding means for making exhaust gases, which are on a side where NOx is to be released and reduced, near a stoichiometric mixture ratio or rich.

3. The apparatus according to claim 1, wherein the second NOx adsorbing catalyst has a capacity conformed to a period of time, in which NOx adsorbed by the first NOx adsorbing catalyst can be released and reduced.

4. The apparatus according to claim 1, wherein the second NOx adsorbing catalyst has a capacity $\frac{1}{5}$ to $\frac{1}{20}$ as much as that of the first NOx adsorbing catalyst.

5. The apparatus according to claim 1, wherein an amount of a gas flowing to that NOx adsorbing catalyst, from which NOx is to be released and reduced, is 1/10 or less as much as a whole amount of exhaust gases.

6. An exhaust gas purifying apparatus for internal combustion engines, in which a NOx adsorbing/reducing catalyst device for adsorbing NOx and decreasing an oxygen concentration to feed a reducing agent to release and reduce NOx when exhaust gases are lean in air-fuel ratio is provided in an exhaust pipe of an internal combustion engine, the apparatus comprising:

a first NOx adsorbing catalyst;

a second NOx adsorbing catalyst provided in parallel to the first NOx adsorbing catalyst and having a small adsorbing capacity as compared with that of the first NOx adsorbing catalyst;

exhaust gas flow passage switchover means for switching an exhaust gas flow between the first NOx adsorbing catalyst and the second NOx adsorbing catalyst;

first NOx releasing and reducing means for causing a gas containing a reducing agent to flow toward the first NOx adsorbing catalyst to decrease an oxygen concentration and releasing and reducing NOx while exhaust gases flow toward the second NOx adsorbing catalyst;

second NOx releasing and reducing means for causing a gas containing a reducing agent to flow toward the second NOx adsorbing catalyst to decrease an oxygen concentration and releasing and reducing NOx while exhaust gases flow toward the first NOx adsorbing catalyst; and NOx releasing/reducing control means, by which switchover of the exhaust gas flow passage caused by the exhaust gas flow passage switchover means, and NOx releasing/reducing operations caused by the first and second NOx releasing and reducing means are performed at predetermined time intervals.

7. The apparatus according to claim 6, further comprising exhaust gas passing means, by which a smaller amount of exhaust gases than that of exhaust gases flowing toward the second NOx adsorbing catalyst is permitted to flow toward the first NOx adsorbing catalyst when NOx in the first NOx adsorbing catalyst is to be released and reduced while exhaust gases flow toward the second NOx adsorbing catalyst and a smaller amount of exhaust gases than that of exhaust gases flowing toward the first NOx adsorbing catalyst is permitted to flow toward the second NOx adsorbing catalyst when NOx in the second NOx adsorbing catalyst is to be released and reduced while exhaust gases flow toward the first NOx adsorbing catalyst, and reducing agent feeding means for making exhaust gases, which are on a side where NOx is to be released and reduced, near a stoichiometric mixture ratio or rich.

8. An exhaust gas purifying apparatus for internal combustion engines, in which a NOx adsorbing/reducing catalyst device for adsorbing NOx and decreasing an oxygen concentration to feed a reducing agent to release and reduce NOx when exhaust gases are lean in air-fuel ratio is provided in an exhaust pipe of an internal combustion engine, the apparatus comprising:

a first NOx adsorbing catalyst;

a second NOx adsorbing catalyst provided in parallel to the first NOx adsorbing catalyst and having a small adsorbing capacity as compared with that of the first NOx adsorbing catalyst;

exhaust gas flow passage switchover means for switching an exhaust gas flow between the first NOx adsorbing catalyst and the second NOx adsorbing catalyst;

first NOx releasing and reducing means for causing a gas containing a reducing agent to flow toward the first NOx adsorbing catalyst to decrease an oxygen concentration and releasing and reducing NOx while exhaust gases flow toward the second NOx adsorbing catalyst;

second NOx releasing and reducing means for causing a gas containing a reducing agent to flow toward the second NOx adsorbing catalyst to decrease an oxygen concentration and releasing and reducing NOx while exhaust gases flow toward the first NOx adsorbing catalyst;

NOx accumulation checking means for checking a NOx accumulation in the first NOx adsorbing catalyst; and exhaust gas flow passage switchover/control means for permitting exhaust gases to flow toward the first NOx adsorbing catalyst when the engine is normally operated, and permitting exhaust gases to flow toward the second NOx adsorbing catalyst when a NOx accumulation in the first NOx adsorbing catalyst exceeds a predetermined value.

9. The apparatus according to claim 8, further comprising exhaust gas passing means, by which a smaller amount of exhaust gases than that of exhaust gases flowing toward the second NOx adsorbing catalyst is permitted to flow toward the first NOx adsorbing catalyst when NOx in the first NOx adsorbing catalyst is to be released and reduced while exhaust gases flow toward the second NOx adsorbing catalyst and a smaller amount of exhaust gases than that of exhaust gases flowing toward the first NOx adsorbing catalyst is permitted to flow toward the second NOx adsorbing catalyst when NOx in the second NOx adsorbing catalyst is to be released and reduced while exhaust gases flow toward the first NOx adsorbing catalyst, and reducing agent feeding means for making exhaust gases, which are on a side where NOx is to be released and reduced, near a stoichiometric mixture ratio or rich.

* * * * *